(12) United States Patent
Sabberton et al.

(10) Patent No.: US 8,275,321 B2
(45) Date of Patent: Sep. 25, 2012

(54) ELECTRICAL CIRCUITS WITH RECONFIGURABLE INTERFERER SIGNAL ROUTING

(75) Inventors: Ian Sabberton, Weston Colville (GB); Paul Christopher Egan, Edinburgh (GB)

(73) Assignee: Cambridge Silicon Radio Limited, Cambridge (GB)

( * ) Notice: Subject to any disclaimer, the term of this patent is extended or adjusted under 35 U.S.C. 154(b) by 920 days.

(21) Appl. No.: 12/229,532

(22) Filed: Aug. 22, 2008

(65) Prior Publication Data

US 2009/0191815 A1  Jul. 30, 2009

(30) Foreign Application Priority Data

Jan. 28, 2008  (GB) .................................. 0801522.4

(51) Int. Cl.
*H04B 1/00* (2006.01)

(52) U.S. Cl. ................. 455/63.1; 455/67.11; 455/67.13; 455/67.14; 455/67.15; 455/114.2; 455/115.1; 455/115.2; 455/115.3; 455/115.4; 455/296; 455/310

(58) Field of Classification Search ................. 455/63.1, 455/67.11, 67.13, 67.14, 67.15, 114.2, 115.1, 455/115.2, 115.3, 115.4, 277.2, 296, 310
See application file for complete search history.

(56) References Cited

U.S. PATENT DOCUMENTS

| 5,710,995 | A | * | 1/1998 | Akaiwa et al. ............. 455/277.2 |
| 6,931,234 | B1 | * | 8/2005 | Higashi ...................... 455/67.11 |
| 7,873,318 | B2 | * | 1/2011 | Nagai et al. .................. 455/63.1 |
| 7,912,438 | B2 | * | 3/2011 | Filipovic et al. .............. 455/310 |
| 2005/0079825 | A1 | * | 4/2005 | Omori et al. ............... 455/67.11 |
| 2007/0072567 | A1 | * | 3/2007 | Nagai et al. .................. 455/205 |
| 2007/0082616 | A1 | * | 4/2007 | Bird .............................. 455/63.1 |
| 2007/0298748 | A1 | * | 12/2007 | Banh et al. .................... 455/296 |

* cited by examiner

*Primary Examiner* — Junpeng Chen
(74) *Attorney, Agent, or Firm* — Louis J. Franco; Law Office of Louis J. Franco

(57) ABSTRACT

An electrical circuit comprises a source of an interferer signal; at least one component configured for using the signal; at least two electrically parallel conductive paths by which the signal can pass between the source and each of the at least one components; and a signal path selector configured to selectively enable the signal to pass from the source to the component by any of the at least two conductive paths and to, when one of the paths is enabled to carry the signal, disable each of the other at least two paths from carrying the signal.

15 Claims, 2 Drawing Sheets

ELECTRICAL CIRCUITS WITH RECONFIGURABLE INTERFERER SIGNAL ROUTING

FOREIGN PRIORITY CLAIM

Priority based on British Patent Application Serial No. GB0801522.4 filed Jan. 28, 2008, and entitled "SIGNAL ROUTING" is claimed. The entirety of the disclosure of the previous foreign application, including the drawings and claims, is incorporated herein by reference as if set forth fully in the present application.

BACKGROUND

Components of an integrated circuit (IC) can be affected by interference from signals on the IC. For example, in a radio transceiver IC there can especially be interference from the clock signals that are used to provide for synchronisation in the circuit. One approach to reducing the effect of this interference is to select the clock frequency carefully to reduce the effect of its interference, but it is often difficult to select a suitable frequency because of the range of electrical components with which the frequency might interfere. Another approach is to shield the conductive lines that carry the clock signal, but this is often impractical, and conflicts with the requirements to reduce the size of the IC. A further approach is to route the conductive lines that carry the clock signal in such a way that the interfering effect that they have on other components is reduced. This latter approach is accompanied by two difficulties. First, the effect of a particular route on interference is difficult to predict simply from a circuit design, since it depends on many properties of the IC and the material of which it is made. This means that in order to find a successful routing it is often necessary to build a test version of the IC with a routing that might work, test the IC, and then feed variations to the design back into subsequent test IC designs. This iterative process is often undesirable because of the high costs of configuring a fabrication plant to produce a particular IC design and the requirement to reduce the time taken to bring new IC designs to market. Another problem with this approach is that many ICs are so congested that it is very difficult to find one route that does not cause interference. More specifically, moving a clock line away from one component to reduce interference normally requires moving it towards another component where interference is consequently increased.

The aforementioned considerations are not limited to clock lines on ICs. Clock lines are a particular problem because they often need to run to a range of locations on an IC, but interference can come from other sources on other lines. In addition to ICs, similar considerations apply on circuit boards and within device assemblies as a whole.

Accordingly, there exists a need to reduce interference from sources such as clock lines in devices such as ICs.

SUMMARY

According to one aspect of the present invention, there is provided an electrical circuit including a source of an interferer signal; at least one electrical component configured for using the signal; at least two electrically parallel conductive paths through which the signal can pass between the source and each of the at least one components; and a signal path selector configured to (i) enable the signal to pass from the source to each component through a selected one of the at least two conductive paths associated with that component and, when one of the associated conductive paths is enabled to carry the signal, (ii) disable the other of the associated conductive paths from carrying the signal.

In various embodiments, the electrical circuit comprises a first set of switches including at least one primary switch capable of alternatively conductively linking the at least two electrically parallel conductive paths associated with a component to the source of interferer signal. The signal path selector may be configured to enable and disable the paths by means of the primary switches.

In various alternative embodiments, the electrical circuit may comprise a second set of switches including at least one secondary switch capable of alternatively conductively linking the at least two electrically parallel conductive paths associated with a component to that component. In versions in which both a primary and a secondary switch are associated with a component, the primary switch is situated electrically more proximate, but not necessarily physically more proximate, the source of interferer signal than is the secondary switch. More precisely, as between primary and second switches, the primary switch is defined as the switch first encountered by a signal that emanates from the source of interferer signal and through which that signal is conducted into one of the parallel conductive paths associated with a component, while the secondary switch is defined as the switch through which an interferer signal that has been conducted through one of the parallel conductive paths is conducted for communication to the associated component. The signal path selector may be configured to selectively enable and disable the paths associated with a component by means of the associated primary and secondary switches. Use of both first and second sets of switches allows the controller to totally disconnect a signal path that is disabled. A path that is disabled from carrying the interferer signal may then float or be connected to a non-interferer signal such as a fixed voltage, e.g. circuit ground.

Preferably, each path comprises or consists of an electrically conductive track. The track is preferably elongate and extends a substantial distance across the circuit.

The circuit may comprise a second component and the conductive paths associated therewith may be disparately routed such that the interfering effect on the second component of signals in the respective paths is different.

In various implementations, the interferer signal is a clock signal. In such implementations, the at least one component may be clocked by the clock signal.

In still additional implementations, the electrical circuit may be embodied in an integrated circuit. Moreover, the electrical circuit may further comprise a non-volatile memory and, in some versions, the signal path selector may be configured to enable or disable the paths in dependence on data stored in the non-volatile memory. The signal path selector may also be configured to enable or disable the paths in dependence on the mode of operation of the circuit.

According to a second aspect of the present invention, there is provided a method of reducing interference in an integrated circuit, the method comprising: determining a set of at least two candidate signal routes between a source of an interferer signal and a consumer of the signal (e.g., an electrical component configured for consuming the signal); manufacturing a first integrated circuit embodying the source of the interferer signal, the consumer of the signal, at least two electrically conductive paths defining the at least two candidate signal routes and a signal route controller capable of enabling the signal to pass from the source to the component by any of the candidate signal routes and to, when one of the routes is enabled to carry the signal, disable each of the at least one other route from carrying the signal, the signal route controller being configurable in firmware to adopt a selected signal route; testing the first integrated circuit to determine a preferred signal route; defining firmware suitable for configuring the signal route controller to enable the preferred signal route; manufacturing further integrated circuits to the same design as the first integrated circuit; and configuring the further integrated circuits in accordance with the defined firmware. The route that provides the best protection against interference from the interferer signal may be selected as the preferred route.

Representative, non-limiting embodiments and implementations are more completely described and depicted in the following detailed description and the accompanying drawings.

DETAILED DESCRIPTION

The following description of variously embodied electrical circuits is illustrative in nature and is therefore not intended to limit the scope of the invention or its application of uses.

Figure 1:
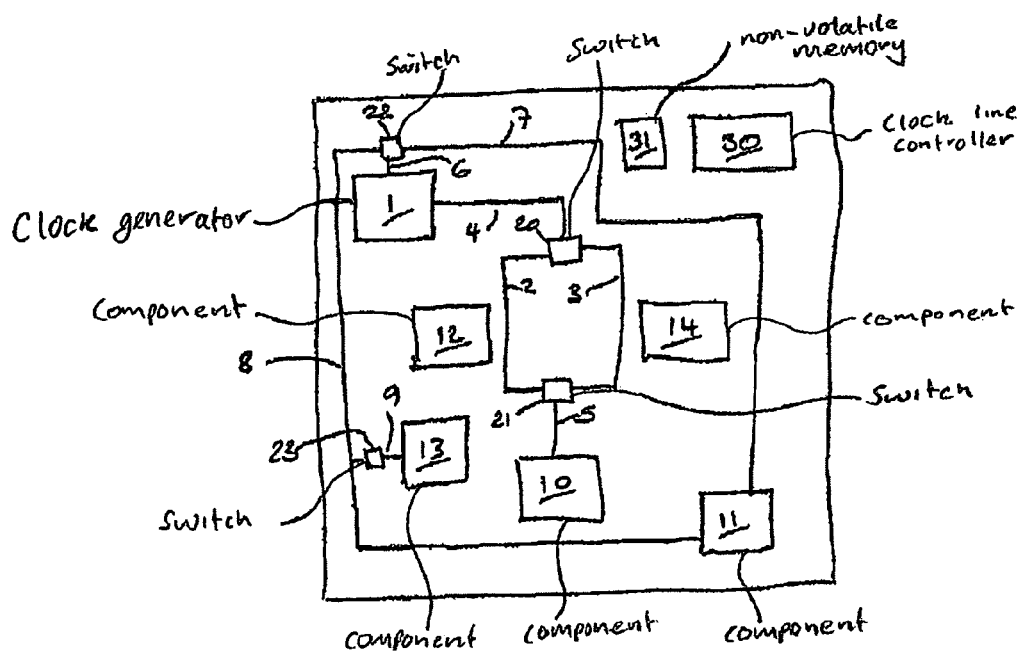
FIG. 1 shows a simplified schematic view of an integrated circuit.
Figure 2:
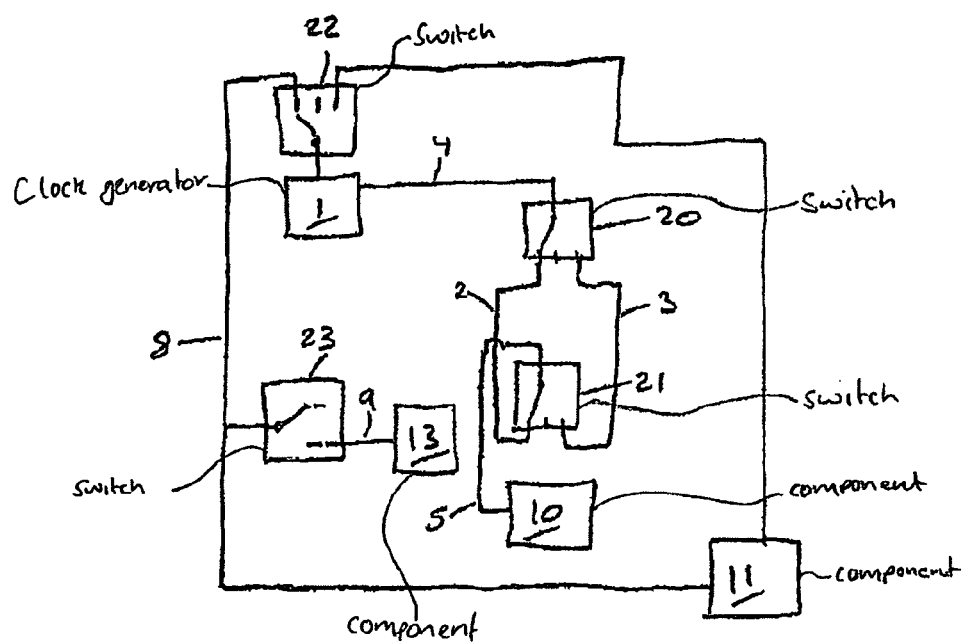
FIG. 2 shows a simplified circuit diagram of the IC of FIG. 1.

The IC of FIG. 1 has a clock generator 1 which generates a clock signal and a set of clock lines 2 to 9 by means of which that signal can propagate around the IC. Various illustrative electrical components designated 10 to 14 are located on the IC. These components may consume the clock signal, as in the case of components 10 and 11, or may not. The clock lines 2 through 9 are configured so as to provide more than one route for clock signals to pass from the clock generator 1 to at least one component that consumes it. These plural routes are electrically in parallel with each other. In the illustrative version of FIG. 1, switches 20-23 are located in the clock lines. The switches 20-23 are under the control of a clock line controller 30. The clock line controller 30 can use the switches 20-23 to isolate some parts of the clock lines 2 through 9. In that way, the IC can be reconfigured at build-time, through firmware or dynamically during use so that selected parts of the clock lines 2 through 9 do not carry clock signals and, therefore, do not generate interference.

In more detail, the network of clock lines 2 through 9 in the IC of FIG. 1 includes sections like those constituted by switches 20, 21 and clock line segments 2, 3. Clock signals from the clock generator 1 pass along clock line segment 4 to switch node 20. Depending on the configuration of switch node 20 the signals then pass either to clock line segment 2 or to clock line segment 3. Each of clock line segments 2 and 3 terminates at switch node 21, which can selectively connect one of line segments 2 and 3 to clock line segment 5. Clock line segment 5 runs to component 10. The clock line controller 30 can configure the switch nodes 20, 21 to pass clock signals in two ways. According to a first configuration, segment 4 is connected to segment 5 via segment 2, with segment 3 disconnected from segments 2, 4 and 5. In this configuration, clock signals pass to component 10 via segments 4, 2 and 5, but segment 3 carries no clock signals. According to a second configuration, segment 4 is connected to segment 5 via segment 3, with segment 2 disconnected from segments 3, 4 and 5. In the second configuration, clock signals pass to component 10 via segments 4, 3 and 5, but segment 2 carries no clock signals.

It will be appreciated from the foregoing example that the route that clock signals take is reconfigurable once the IC has been built. In alternative implementations, the clock line controller 30 can configure the switch node 20 so that neither line segment 2 nor line segment 3 is connected to receive clock signals. This prevents component 10 from receiving clock signals, but that does not matter if component 10 is currently dormant or is operating in a mode in which it does not need to consume clock signals. In a similar way, clock signals can be blocked or routed in various ways around the IC by means of the line segments 6 through 9 and switch nodes 22 and 23.

There may be various reasons for operating the IC in a certain clock line configuration. As mentioned above, it is often difficult to predict from design specifications how components on an IC will respond to signals leaking from lines running across the IC. With an IC such as that of FIG. 1, the IC can be built with a range of available clock-line routings that look to the designer as if they may be beneficial. When the IC has been built it can be tested so as to find the response of its components to clock signals on various routes. Once this is known, the designer can choose the best available routing and configure future ICs of the same build to use that routing. That configuration can be done in firmware, for example, by storing the configuration in a non-volatile memory 31. The clock line controller 30 reads the configuration that is programmed in the memory 31 and operates in accordance with it when the IC is in operation.

In alternative versions of an IC such as that of FIG. 1, the IC can be dynamically reconfigured during operation. For example, clock signals on segment 3 may cause more interference with component 14 and less with component 12, and clock signals on segment 2 may have the reverse effect. Depending on which of components 12 and 14 is in use, or on which is most critical in a particular situation, the clock line controller 30 could select a route that uses segment 2 or 3 at a particular time during the operation of the IC and then switches to the other route at another time. The logic used to decide which of those routes to use could be hard-wired into the clock line controller 30 or could be programmed in firmware once the response of a sample IC to the various signals has been assessed.

In alternative implementations, clock line routes could feed individual devices, as described above, or sections of the IC, each of which sections contains various devices. The latter approach is convenient when an IC implements sections that are typically operated alternately. For instance, the IC could have radio transceivers that operate for different protocols. When one of those transceivers is in use, clock signals could pass to it by a certain route and clock signals to the other transceiver could be disabled, and vice versa.

Figure 3:
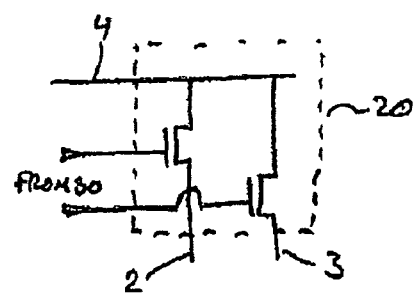
FIG. 3 shows an example of a switch node.

The clock line controller 30 could be a dedicated logic circuit or could be implemented by a generic processor implemented on the IC. Clock lines, such as any of clock lines 2 through 9, could be strips of conductive material. Switch nodes, such as any of switch nodes 20 through 23, could be implemented by transistors, for example, as shown in more detail in FIG. 3 with respect to switch node 20. It is also to be understood that the clock signals could be received from off the IC. Moreover, similar principles could be applied to routing signals other than clock signals, and as well as on ICs to signal routing on circuit boards and within whole device assemblies.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description, it will be evident to a person skilled in the art that various modifications may be made within the scope of the invention as defined in each of the appended claims.

What is claimed is:

1. An electrical circuit comprising:
   a source of an interferer signal;
   at least one electrical component configured for using the interferer signal;
   at least two electrically parallel conductive paths through which the interferer signal can pass between the source and each of the at least one electrical components; and
   a signal path selector configured to (i) enable the interferer signal to pass from the source to each of the at least one electrical components through a selected one of the at least two electrically parallel conductive paths associated with each of the at least one electrical components and to, when one of the at least two electrically parallel conductive paths associated with each of the at least one electrical components is enabled to carry the interferer signal, (ii) disable the other of the at least two electrically parallel conductive paths associated with each of the at least one electrical components from carrying the interferer signal.

2. The electrical circuit as claimed in claim 1 wherein the interferer signal is a clock signal and the at least one electrical component is clocked by the clock signal.

3. The electrical circuit as claimed in claim 2 further comprising at least one primary switch capable of alternatively conductively linking the at least two electrically parallel conductive paths associated with one of the at least one electrical components to the source of interferer signal.

4. The electrical circuit as claimed in claim 3 further comprising at least one secondary switch capable of alternatively conductively linking the at least two electrically parallel conductive paths associated with one of the at least one electrical components to that electrical component.

5. The electrical circuit as claimed in claim 2 further comprising a non-volatile memory and wherein the signal path selector is configured to alternatively enable and disable each of the at least two electrically conductive paths in dependence on data stored in the non-volatile memory.

6. The electrical circuit as claimed in claim 5 wherein the electrical circuit is embodied in an integrated circuit.

7. The electrical circuit as claimed in claim 2 wherein the signal path selector is configured to alternatively enable and disable each of the at least two electrically parallel conductive paths in dependence on a mode of operation of the electrical circuit.

8. The electrical circuit as claimed in claim 7 wherein the electrical circuit is embodied in an integrated circuit.

9. The electrical circuit as claimed in claim 1 further comprising a non-volatile memory and wherein the signal path selector is configured to alternatively enable and disable each of the at least two electrically parallel conductive paths in dependence on data stored in the non-volatile memory.

10. The electrical circuit as claimed in claim 9 wherein the electrical circuit is embodied in an integrated circuit.

11. The electrical circuit as claimed in claim 10 further comprising at least one primary switch capable of alternatively conductively linking the at least two electrically parallel conductive paths associated with one of the at least one electrical components to the source of interferer signal.

12. The electrical circuit as claimed in claim 1 wherein the signal path selector is configured to alternatively enable and disable each of the at least two electrically parallel conductive paths in dependence on a mode of operation of the electrical circuit.

13. The electrical circuit as claimed in claim 12 wherein the electrical circuit is embodied in an integrated circuit.

14. The electrical circuit as claimed in claim 13 further comprising at least one primary switch capable of alternatively conductively linking the at least two electrically parallel conductive paths associated with one of the at least one electrical components to the source of interferer signal.

15. A method of reducing interference in an integrated circuit, the method comprising:
   determining a set of at least two candidate signal routes between a source of an interferer signal and an electrical component configured for consuming the the interfere signal;
   manufacturing a first integrated circuit embodying the source of the interferer signal, the electrical component configured for consuming the interferer signal, at least two electrically conductive paths defining the at least two candidate signal routes and a signal route controller capable of selectively enabling the interferer signal to pass from the source to the electrical component by any of the at least two candidate signal routes and to, when one of the at least two candidate signal routes is enabled to carry the interferer signal, disable each of the other at least two candidate routes from carrying the interferer signal, the signal route controller being configurable in firmware to adopt a selected signal route;
   testing the first integrated circuit to determine a preferred signal route;
   defining firmware suitable for configuring the signal route controller to enable the preferred signal route;
   manufacturing further integrated circuits to a design the same as the first integrated circuit; and
   configuring the further integrated circuits in accordance with the defined firmware.

\* \* \* \* \*